(No Model.)
E. HAIMAN, R. HUETTICH & C. BISHOP.
CULTIVATOR.
No. 571,307. Patented Nov. 10, 1896.
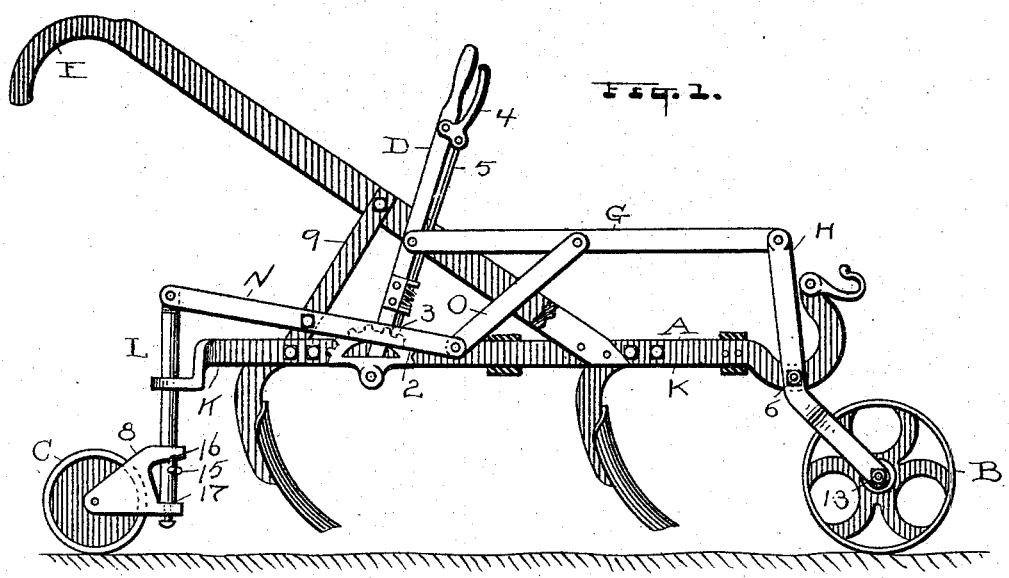
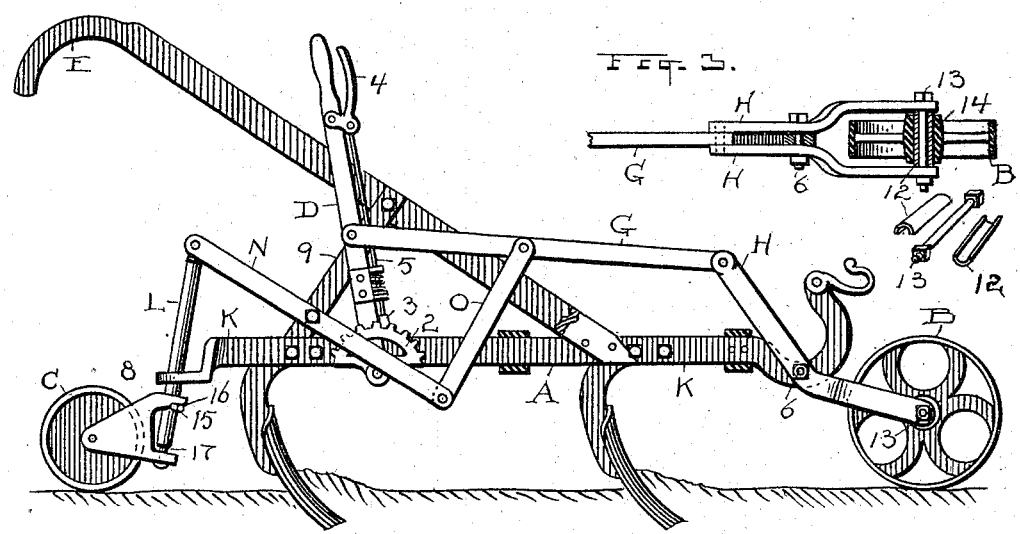

UNITED STATES PATENT OFFICE.

ELIAS HAIMAN, REINHOLD HUETTICH, AND CLARK BISHOP, OF CLEVELAND, OHIO, ASSIGNORS TO THE EMPIRE PLOW COMPANY, OF SAME PLACE.

CULTIVATOR.

SPECIFICATION forming part of Letters Patent No. 571,307, dated November 10, 1896.

Application filed February 19, 1896. Serial No. 579,885. (No model.)

*To all whom it may concern:*

Be it known that we, ELIAS HAIMAN, REINHOLD HUETTICH, and CLARK BISHOP, citizens of the United States, residing at Cleveland, in the county of Cuyahoga and State of Ohio, have invented certain new and useful Improvements in Cultivators; and we do hereby declare that the following is a full, clear, and exact description of the invention, which will enable others skilled in the art to which it appertains to make and use the same.

Our invention relates to field-cultivators; and the invention consists in a cultivator having the parts thereof constructed, combined, and operating substantially as shown and described, and particularly pointed out in the claims.

In the accompanying drawings, Figure 1 is a longitudinal sectional elevation of the cultivator shown as resting on its wheels, as occurs when the cultivator is carried to or from the field or when for any reason it is desired that the cultivator teeth or shovels should be withdrawn from the ground or regulated as to depth, all as hereinafter fully described. Fig. 2 is a longitudinal sectional elevation corresponding to Fig. 1 in all particulars except that in this case the wheels are raised and the cultivator-teeth are shown as set into the ground as when engaged in work. Fig. 3 is a sectional plan view of the front wheel on the line of its axles and of the parts of the bearing for said wheel separately illustrated so as to show the construction of the said bearing more clearly. Figs. 4 and 5 are views showing the present means for locking the rear wheel to a direct line of movement when the parts are in working position, as in Fig. 2, and leaving it free to play laterally when the parts are in position and relation as seen in Fig. 1.

A represents the cultivator-frame, and this frame may be of any preferred style or kind that is adapted to be used after the manner of the frame here shown. Therefore it may be a rigid frame having a certain fixed width, or it may be made with sides laterally adjustable, thereby adapting it to different widths of rows and to work closer to or farther from the rows, as may be necessary. Either form or style may be assumed to be present in this case, as this is not material to the invention.

Now in order that the cultivator may be equipped with simple and effective appliances for conveying it from place to place, as well as to graduate its depth of work, we provide a single wheel for each end of the frame A and represented by B and C, respectively.

Of course we are aware that a cultivator-frame equipped with adjustable wheels at its front and rear is not new, and we do not now claim such arrangement and combination of parts as our invention broadly, but notwithstanding the many implements in cultivators, shovel-plows, harrows, and the like in which casters or other wheels are variously shown and variously adjustable we do believe and claim that the simple and effective and manifestly practical and direct mechanism shown by us is original and novel. This mechanism consists of a certain cheap and simple means never before known or used, so far as we are aware, and comprises a hand-lever D, which is fulcrumed at its lower end on the frame A, usually at about the center of the cultivator between its sides, thus bringing it about into alinement with the front and rear wheels B and C. These wheels of course have such width of tread as to make them ample supports for the cultivator when they are lowered to carry the cultivator, especially with the steadying which the operator gives by always having hold of the handles E. A toothed segmental rack 2, fixed to the frame A, and a spring-actuated pawl or catch 3 and actuating handle and rod 4 and 5 on the lever D, serve to lock the said lever in any adjusted position to which it may be carried by the operator. A single straight main operating-bar G is connected with the said lever at one end and with the upper ends of the front-wheel-supporting standards H at the other end. Two of these standards H are shown, one on each side of the central draft-bar K of the cultivator and pivotally supported thereon by bolt and nut 6 or their equivalent. It will be seen that these standards have two different bends below this bolting or pivot point, one laterally, as seen in Fig. 3, to accommodate the wheel B between them and afford a bearing-support therefor at their lower ends, and the other bend forward with respect to the portion of the standard above the pivot 6, thereby throwing the said wheel well to the front of the pivot 6 and thus making the movement of the said standards on their pivot alone sufficient to raise or lower the cultivator, as shown and described. Obviously, this would be impossible if the standards H were straight unless a long and impracticable sweep of adjustment were employed. As it is, with the lower portion of the said standards always in an inclined position ready to raise or lower the cultivator, the instant that the lever D is moved in either direction, it is possible to effect the required movement and adjustment with comparatively slight movement of the lever D. It will be seen that the long main bar G is therefore at no time much out of horizontal position nor the upper part of the standards H out of advantageous adjusting position for wheel B.

The caster-wheel C is connected with the main bar G with a like easy and direct mechanism. This caster has a vertical standard or supporting-rod L, which passes through a suitable hole in the rear end of the extension of bar K of the frame, and a bifurcated head 8 forms the immediate support for the caster C and is itself swiveled on the standard, but subject to be locked thereon at certain times, as hereinafter described.

The caster-standard is adapted to slide up and down in support as shown or in whatever other support may be provided therefor, but to simplify the operation it is also allowed to take an inclined position somewhat as seen in Fig. 2, thus adapting it to the positions of the pivoted operating-bar N. This bar is pivoted at about its middle in this instance on the handle-supporting brace 9, but it may be pivoted elsewhere or on any other suitable support, and at its opposite end the said bar N is connected with the main bar G by link O. The several parts N O are so constructed in respect to length and arranged in respect to all their connections that the movement of caster C will correspond to the movement of wheel B and that both will be actuated in like degree and at the same time in the same direction.

Referring now again to the front wheel B, it will be seen in Fig. 3 that the bearing therefor consists in this instance of a bearing-sleeve formed in two sections 12, longitudinally adapted to be engaged between the standards H by the clamping-bolt 13, which passes through said arms and sleeve and the hub of the wheel B, as clearly seen in Fig. 3. These sleeve-sections are slightly longer than the depth of the hub 14, so that when the bolt 13 is tightened the sleeve will be clamped tightly between said standards, but the wheel-hub will have sufficient freedom to insure easy action.

The standard-bars H practically constitute a single standard for the wheel B and are so regarded and claimed.

Referring to the locking mechanism for the rear caster C, a pin 15 on shaft L is shown, which is adapted to be engaged by the groove 16 in the head 8 when the machine is working as shown in Fig. 2. This keeps the wheel locked, so as to travel in a straight line with the forward wheel. The lower bearing of the head 8 is pivoted on a reduced extremity of the shaft L and is adapted to have a limited up-and-down movement, which will throw the groove 16 into or out of locking engagement with the pin 15. When the machine is moved from one place to another, it is desirable to have the rear caster free to rotate, so as to facilitate the easy guidance of the machine, and this is done when the cultivators are raised out of the ground, as shown in Fig. 1.

The shoulder 17, formed by the reduced portion of the shaft L, rests on the lower bearing of the head 8, keeping the head unlocked and free to rotate when the weight of the machine is upon it.

What we claim as new, and desire to secure by Letters Patent, is—

1. The cultivator-frame, the front wheel and two standards for said wheel bent edgewise substantially midway of their length, and pivoted on the sides of said frame in the angle of their bend, in combination with the operating bar and lever connected with the tops of said standards, the lower portion of said standards extending forward of the pivot-point at an inclination, substantially as described.

2. The frame of the cultivator, the front wheel B, the two flat standards H for said wheel bent midway of their length and pivoted in the angle of their bends on said frame, the lower portion of said standards projecting forward from the said pivot-point, in combination with the operating-bar G, a single rear wheel and mechanism connecting said rear wheel operatively with said bar G, substantially as described.

3. The cultivator-frame, the rear caster and its standard constructed to slide up and down in said frame, an operating-bar N pivoted to the top of said standard at one end, and to an operating-link O at the other end and pivoted at about its middle on the cultivator-frame, and an actuating-bar G and lever D connected with said link, substantially as described.

4. The cultivator-frame, the front wheel and the supporting-standards H for said wheel bent and pivoted at about their middle on said frame, in combination with the single rear caster-wheel C, and a vertically-sliding standard L therefor, the operating-bar G connected with the top of said standards H, and the lever D for operating said bar, the link C pivoted to said bar G and the bar N pivoted between its ends and connecting the rear caster-standard with the link O, substantially as described.

Witness our hands to the foregoing specification this 11th day of February, 1896.

ELIAS HAIMAN.
REINHOLD HUETTICH.
CLARK BISHOP.

Witnesses:
H. T. FISHER,
H. E. MUDRA.